Jan. 16, 1968   A. J. FOGLIA ETAL   3,363,828
HEAT SEALABLE THERMOPLASTIC BAG
Filed Dec. 16, 1966

INVENTORS
ANDREW J. FOGLIA
FRANCIS P. KEHOE

United States Patent Office 3,363,828
Patented Jan. 16, 1968

3,363,828
HEAT SEALABLE THERMOPLASTIC BAG
Andrew J. Foglia, Plainfield, and Francis P. Kehoe, New Brunswick, N.J., assignors to Mobil Oil Corporation, a corporation of New York
Filed Dec. 16, 1966, Ser. No. 602,278
4 Claims. (Cl. 229—62)

ABSTRACT OF THE DISCLOSURE

A bag blank formed from a homopolymer or copolymer of polybutene which comprises a continuous tube of film open at opposite ends thereof, each end of the bag having a flap which is an integral extension of one of the bag walls. The flap or the exterior surface of the bag wall adjacent thereto, is coated with a thermally responsive adhesive material, e.g. an ethylene-butene copolymer, which adhesive material has a sealing temperature below that of the material of bag construction. The flap is adapted to be folded over the open bag end, and thermally sealed to the exterior surface of the bag wall adjacent thereto.

---

The present invention relates to an improved closure for heavy duty bags of thermoplastic materials, and in particular to thermoplastic bag structures fabricated from polybutene-1, butene-1 copolymers, and mixtures or blends thereof and the like. The invention also relates to an improved method of forming such closures. More particularly, the invention relates to an improved heat sealed closure for bags of heavy gauge polybutene-1 film formed by fusing the exterior bag wall surfaces to the inner surfaces of bag wall lips, which lips are integral with, and extensions of, the bag walls proper and are located at opposite ends of the bag structures. The invention further relates to a heat sealed closure, and method of forming it, wherein specific measures are employed to control the requisite sealing temperature in order to gain greater seal strength and insure that forces applied to the seal surfaces, encountered during handling and transport of the filled bag, are caused to be exerted in shear, rather than in tension or "peel."

It has been shown in the prior art that, in the sealing of tubular heavy duty bags, the seal may be effected by simply heat welding of the open ends of the bag together whereby the front and back walls of the bag tube are fused together along their edges. Certain disadvantages attendant to this type of seal include poor impact resistance since when opening forces are exerted thereon, e.g., the pressure which the contents of a bag exert against the seal during normal handling thereof, the seal will tend to pull or peel apart at the fused inner surfaces of the bag and destroy the seal. In addition, the minimum requisite sealing temperatures for the preferred thermoplastic film materials employed in such bag structures in accordance with the present invention, such as polybutene-1 for example (sealing temperature on the order of at least 126° C.) is prohibitively high since such temperatures result in the formation of local stress areas within the seal area which serve to further reduce the impact resistance of such a seal.

It has also been proposed in the prior art, to in part remedy the aforenoted deficiencies, to form bag closures for heavy duty thermoplastic bags by fusing the inner surfaces of an applied, U-shaped seal or cap strip to the exterior surfaces of opposed wall portions of a bag along narrowly defined areas, longitudinally of the seal strip and laterally of the bag wall portions. To be effective, in this form and method of closure, the fusion must be accomplished under closely controlled conditions of pressure and temperature, in order to avoid incidental fusion or adhesion of the inner surfaces of the opposed bag wall portions. Inasmuch as this sealing operation must be accomplished in the field under less than ideal circumstances, the control of heat and pressure may vary to the extent of producing closure seals which do not leave the corresponding inner bag surfaces free to separate without damage. In addition, it is obvious that when such a "tape-overlay" method of sealing is employed, numerous process and equipment difficulties arise, including control and method of tape application as well as economic disadvantages attendant to the employment of special and sometimes costly sealing tapes.

In accordance with the present invention an improved closure for heavy duty thermoplastic bags is provided which insures that the forces exerted on the seal areas are specifically restricted to forces in shear rather than in tension. Moreover, the employment of extraneous means, such as the tape overlay materials as aforediscussed, are eliminated, the closure seal being effected with material which is integral with the bag structure itself.

The heavy duty thermoplastic bags of the present invention comprise tubular bags having, when in an unfilled, unsealed and flattened condition, a front wall and a back wall. The open top portion of the bag is provided with a flap comprising an integral extension of either the front wall or back wall, said flap extending completely across the open top edge of the bag. The open bottom portion of the bag is also provided with a similar flap comprising an integral extension of either the front wall or the back wall, said flap extending completely across the open bottom edge of the bag. The bags are further characterized by having heat-sensitive adhesive stripes located in the vicinity of the top and bottom open ends of the bag.

The bag structures of the present invention may be fabricated from tubular bag blanks that, in lay-flat form, are of substantially rectangular configuration. The bag blank, before sealing at opposite ends thereof, comprises a front wall and a back wall of thermoplastic film. The thermoplastic film is preferably a homopolymer of butene-1 or a copolymer of butene-1 with another alpha-olefin such as ethylene for example. An upper flap and a lower flap, which are integral extensions of the bag walls, are located at opposite ends of the bag blank. Each of the flaps are adapted to be folded over the outside portion of the adjacent bag wall and heat sealed thereto. The heat sealing is facilitated by coating either the inner surface of the bag flaps or the surface of the adjacent bag wall which the flaps are in contact with in a folded over position, with a coating of a thermally responsive adhesive material which has a melting point below the melting point of the thermoplastic film from which the bag is fabricated.

The present invention may be more fully understood from the following description, when it is read with reference to the following drawings, in which.

Figure 1:
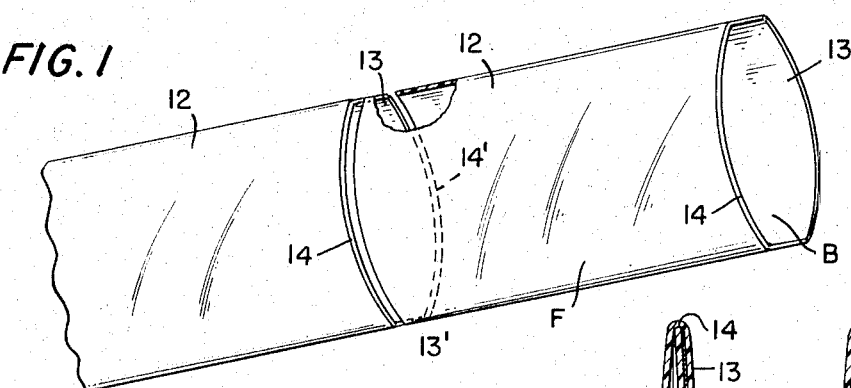
FIGURE 1 is a perspective view of a continuous thermoplastic tube structure which may be utilized to form the bag structure of the present invention.
Figure 2:
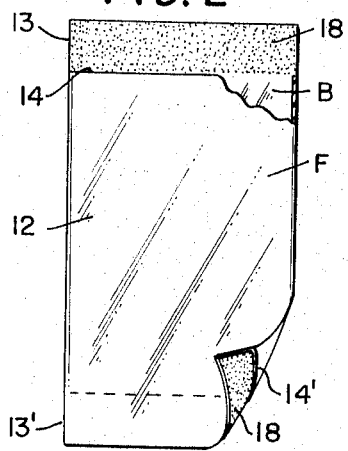
FIGURE 2 is a plan view of a bag blank in accordance with the present invention.
Figures 4, 6:
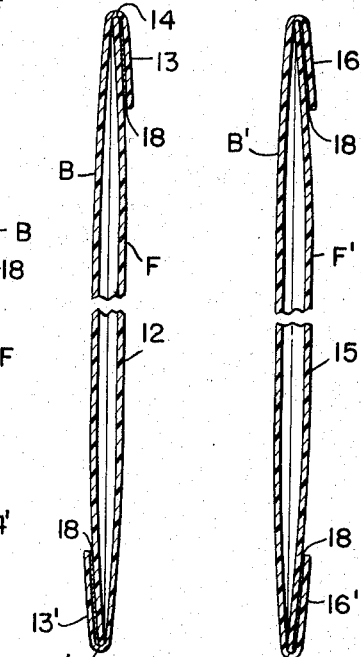
FIGURE 4 is a sectional view of a closed bag structure fabricated from the bag blanks illustrated in FIGURES 2 and 3.
FIGURE 6 is a sectional view of a closed bag fabricated from the bag blank embodiment illustrated in FIGURE 5.

As more clearly illustrated in FIGURE 1, the novel bag structures of the present invention may be fabricated from a continuous tube of thermoplastic material. The bag blanks are cut from the respective thermoplastic tube in such a manner, that a continuous tube section results comprising a front wall F and a back wall B. As more clearly illustrated in FIGURE 2, the bag blank 12 of the present invention, when in flattened, unsealed and unfilled form, comprises a back wall B which is substantially the same length as front wall F. The upper portion of back wall B extends beyond the upper edge 14 of front wall F to form upper flap 13, and the lower edge of front wall F extends beyond the lower edge 14' of back wall B to form bottom flap 13'. As shown in FIGURE 4, when it is desired to form a closed bag structure from the bag blank embodiment illustrated in FIGURE 2, bottom flap 13' is folded up into overlying engagement with the outer surface of back wall B and adhesively secured thereto by means of the adhesive coating 18 carried upon the inner surface of bottom flap 13'. After the novel structures of the present invention have been filled with product, the top portion of the bag structure is sealed simply by folding top flap 13 into overlying engagement with the outer surface of front wall F and adhesively securing it thereto by means of the adhesive coating 18 carried on the inner surface of upper flap 13.

Figure 3:
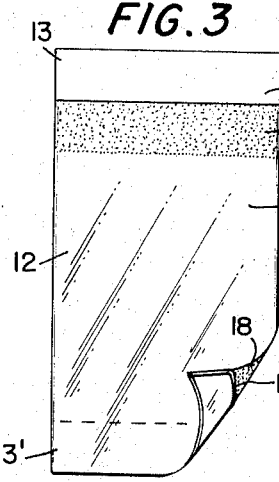
FIGURE 3 is a modified form of the bag blank illustrated in FIGURE 2.

As illustrated in the embodiment of the bag blank shown in FIGURE 3, it is not necessary that the adhesive layer 18 be applied to the inner surface of lips 13 and 13'. Moreover, the adhesive coating may be located on the outside surface of the upper portion of the front wall just below edge 14 at the top of the bag and likewise, at the bottom of the bag, the adhesive material may be applied to the bag blank on the outer surface of the lower edge of back wall B above edge 14' as illustrated in FIGURE 3.

Figure 5:
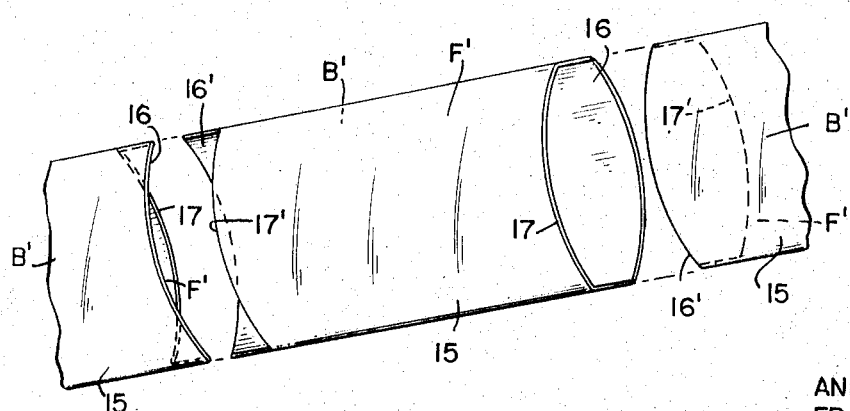
FIGURE 5 is a perspective view which illustrates another embodiment of the bag structures of the present invention being formed from a continuous tube of thermoplastic.

FIGURES 5 and 6 illustrate a still further embodiment of the thermoplastic bag structures of the present invention. As illustrated in FIGURE 5 the bag blank may be severed from a continuous tube of thermoplastic material as in the case of the previously described embodiment. The bag blank 15 illustrated in FIGURE 5 comprises front wall F' and back wall B'. Back wall B' being longer than front wall F' results in a pair of flaps 16 and 16' located at opposite ends of the bag which extend above the upper edge 17 of front wall F' and below the lower edge 17' of front wall F' respectively. As illustrated in FIGURE 6, when it is desired to form a bag utilizing such a bag blank, the bottom of the bag is sealed by folding lower flap 16' into overlying engagement with the lower edge 17' of bag wall F' and adhesively secured thereto by means of an adhesive stripe located either on the inside surface of flap 16' or on the outer surface of front wall F' in the vicinity of edge 17'. After the bag has been filled with product, the top portion of the bag may be sealed in a similar fashion, whereby flap 16 is folded over and adhesively secured to the upper exterior surface of front wall F' in the vicinity of edge 17. This sealing arrangement is more clearly illustrated in FIGURE 6 of the attached drawings.

Thus, when employing the sealing arrangement in accord with the bag structures of the present invention, a bag closure is produced wherein during bag transport and handling the bag wall portions in the closure ends tend to assume a position such that stresses applied to the sealed areas are resisted in shear rather than in tension or peel as in the conventionally formed seal.

As hereinbefore indicated, the preferred material employed in the formation of the bag structures of the present invention are thermoplastics and in particular a thermoplastic film such as that formed by the extrusion of normally solid polybutene resin material. The bag wall thickness or gauge may vary from about 1 to about 10 mils and for heavy duty bag applications is preferably about 5 mils. Polybutene bags exhibit better impact resistance than many other thermoplastic materials, such as polyethylene for example, when sealed in accord with the method of the present invention.

The adhesive materials which may be employed to effect closure of the bag structures of the present invention include thermally responsive adhesive materials such as for example thermoplastics. When employing the preferred thermoplastic material in the bag structures of the present invention, i.e. polybutene-1, the thermally responsive adhesive material should have a melting point below the melting point of the polybutene-1 bag material, i.e. below the crystalline melting point of polybutene-1 (126° C.) and must be compatible, i.e. adherent to the polybutene bag when it is applied thereto. A particularly preferred material for employment as the adhesive material used to effect closure of polybutene bags in accord with the method of the present invention has been found to be an ethylene-butene copolymer with a melt index of from about 2 to about 50 and preferably a melt index of about 40. The ethylene-butene copolymer material may be applied to the surface of the polybutene film utilizing a hot melt method i.e. application of a melt of the copolymer onto the surface of the polybutene bag, or the copolymer adhesive material may be applied to the thermoplastic bag structure from a solvent media, the latter being a preferred method of application.

The copolymer adhesive material employed in the following example was an ethylene butene-1 copolymer having a melt index at 190° C. of 40, a methylene absorption value of .014, an ethylene content of 3 to 6%, and a crystalline melting point of 96° C. (Differential Thermogram). It has been found that such a copolymer adhesive coating is capable of fusing and welding the bag flap to the bag wall at sealing temperatures as low as 80° C.

The preferred polybutene-1 resin material employed to produce the tubular bag structures of the present invention, utilizing standard tubular extrusion techniques, has a melt index of from about 0.1 to about 2.0 and preferably about 0.4. The isotactic index, as measured by the ether extraction method, is desirably from about 90% to about 98% and preferably about 96%.

The polybutene-1 film, fabricated from the aforedescribed resin materials, and employed to form the bag structures of the present invention has a tensile yield of at least about 1600 p.s.i. and preferably about 2,000 p.s.i.; a tensile strength of at least about 4,000 p.s.i. and preferably about 4,800 p.s.i.; a tensile modulus of from about 25,000 p.s.i. to about 40,000 p.s.i. and preferably about 30,000 p.s.i.; and a brittle point not higher than about −20° C.

The following example illustrates a method for preparing a thermoplastic bag structure in accordance with the present invention. The specific example is directed to one embodiment of the bag structures of the present invention and, accordingly, should not be construed in a limitative sense but is employed merely for purposes of illustration.

*Example 1*

A normally solid polybutene-1 resin, having a melt index of about 0.4 and an isotactic index of about 96% was extruded, utilizing conventional extrusion equipment and techniques, in the form of a tube having a wall thickness of approximately 5 mils. The polybutene-1 film had a tensile yield of about 2,000 p.s.i.; a tensile strength of about 4,800 p.s.i.; a tensile modulus of about 30,000 p.s.i.; and a brittle point of about −20° C. The continuous polybutene tube was subsequently segmented into bag blank structures as illustrated in FIGURE 1 having an upper flap 13 and a lower flap 13'. The entire inner surface of flaps 13 and 13' were coated with a solution of the aforedescribed ethylene-butene copolymer material dissolved in chloroform (10 parts by weight of copolymer per 100 parts of chloroform). The measured thickness of the copolymer adhesive coating, after evaporation of the chloroform solvent at room temperature for a period of about 10 seconds, was approximately 0.3 mil.

A bag was formed from the aforedescribed bag blank structure by folding bottom flap 13' up into overlying engagement with the exterior surface of bag wall B along lower edge 14'. As illustrated in FIGURE 4 of the attached drawings, flap 13' was then adhesively secured thereto by passing the bottom portion of the bag with the flap in the aforedescribed folded over position through the heated sealing bands of a standard Doughboy heavy duty bag sealer. The sealing band not in contact with the overlying adhesive coated flap was insulated with a covering of rubber tape to avoid welding together the upper portions of bag walls B and F. The heated bands on the sealer were maintained at a temperature of approximately 80° C., and the bag as it emerged from the sealing apparatus was bottom sealed, i.e. the copolymer adhesive on folded-over flap 13' was firmly welded to the exterior surface of the lower edge of back wall B. After the bag structure was filled with product, the top portion of the bag was sealed in a similar fashion, i.e. top flap portion 13 was folded down into overlying engagement with the upper edge 14 of back wall F and heat welded thereto by passing the upper portion of the bag with the flap in a folded over condition through the heated bands of the Doughboy sealer, said bands being maintained at a temperature of about 80° C.

Thus it can be seen that in accord with the foregoing example, a bag structure is provided, fabricated from a highly impact resistant polybutene film material, said bag being provided wtih end closures, which are integral with the bag structure per se, and which closures may be formed by heat sealing utilizing standard heavy duty bag sealing equipment. Moreover relatively low sealing temperatures may be employed, e.g. 80° C., which are well below the crystalline melting point of the polybutene film material. Accordingly, and as aforedescribed, the seal formed at such low temperatures is much stronger and more resistant to impact stresses than a seal formed at the higher temperatures, e.g. on the order of 126° C. and above, which are normally requisite for the formation of heat weld closures on polybutene bags without the adhesive coated flap structures of the present invention.

Polybutene bags fabricated in accordance with the method set forth in the preceding example were filled with approximately 50 lbs. of granular fertilizer material and the top of the bags were sealed as described in Example 1. The loaded bags were then tested under very severe impact conditions, i.e. a 21 ft. drop on the gusset along the longitudinal edge of the bags. It was found that such bags could withstand up to 30 drops before impact resistance failure and, in most instances, the bag wall failed, i.e. ruptured, before seal failure.

Although the present invention has been described with preferred embodiments, resort to modifications and variations can be had without departing from the spirit and scope of the invention, as those skilled in the art will readily appreciate. Such variations and modifications are therefore considered to be within the purview and scope of the appended claims.

What is claimed is:

1. A seamless tubular bag blank that in lay-flat form is of substantially rectangular configuration, said tubular bag blank being open at both ends thereof, which comprises a front wall and a back wall of thermoplastic film said bag being further characterized by having a flap on one of said walls at one of said open ends and a flap on one of said walls at the other open end, said flaps being adapted to be folded over, in closing relationship, around said open ends of said bag and heat sealed to the exterior surface of the adjacent bag wall whereby when said bags are filled with product opening forces applied to the sealed ends thereof are resisted in shear rather than in peel, said thermoplastic film comprising a member selected from the group consisting of a homopolymer of butene-1 and a copolymer of butene-1 with another alpha-olefin, each of said flaps being adapted to be folded over the outside portion of the adjacent bag wall, and a coating of a thermally responsive adhesive material on at least one of the contacting surfaces when said flaps are folded over the outside portion of the adjacent bag wall, said material having a melting point below the melting point of said thermoplastic film.

2. A tubular bag blank as defined in claim 1 further characterized by said back wall having an upper flap and extends above the upper edge of said front wall and said back wall having a lower flap that extends below the lower edge of said front wall, said upper and lower flaps being adapted to be folded over the outside portion of the adjacent surface of said front wall, said upper and lower flaps comprising on the inner surfaces thereof a coating of said thermally responsive adhesive material.

3. A tubular bag blank as defined in claim 1 further characterized by said back wall having an upper flap portion that extends above the upper edge of said front wall and said front wall having a lower flap portion that extends below the lower edge of said back wall, each of said flaps being adapted to be folded over the outside portion of the adjacent surface of said bag wall, said upper and lower flaps comprising on the inner surfaces thereof a coating of said thermally responsive adhesive material.

4. A tubular bag blank as defined in claim 1 wherein said thermally responsive adhesive material comprises an ethylene-butene-1 copolymer.

References Cited

UNITED STATES PATENTS

| 259,238 | 6/1882 | Stocking | 229—68.27 |
| 3,081,290 | 3/1963 | Cottle | 260—94.2 X |
| 3,088,256 | 5/1963 | Brown | 93—35 X |
| 3,265,289 | 8/1966 | Hiersteiner | 229—80 |
| 3,278,109 | 10/1966 | Salway | 229—62 X |

DAVID M. BOCKENEK, *Primary Examiner.*